US009889766B2

(12) United States Patent
Kazuno et al.

(10) Patent No.: US 9,889,766 B2
(45) Date of Patent: Feb. 13, 2018

(54) ELECTRIC POWER SYSTEM

(71) Applicant: HONDA MOTOR CO., LTD., Tokyo (JP)

(72) Inventors: Shuichi Kazuno, Wako (JP); Hibiki Saeki, Wako (JP); Yasushi Kojima, Wako (JP); Yasutaka Sakai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/795,891

(22) Filed: Jul. 10, 2015

(65) Prior Publication Data

US 2016/0009195 A1 Jan. 14, 2016

(30) Foreign Application Priority Data

Jul. 14, 2014 (JP) ................. 2014-144193

(51) Int. Cl.
*B60L 9/00* (2006.01)
*B60L 11/00* (2006.01)
*G05D 1/00* (2006.01)
*G05D 3/00* (2006.01)
*G06F 7/00* (2006.01)
(Continued)

(52) U.S. Cl.
CPC ....... *B60L 11/1887* (2013.01); *B60L 11/1811* (2013.01); *Y02T 90/34* (2013.01)

(58) Field of Classification Search
CPC ................. B60L 11/1811; B60L 11/1887
See application file for complete search history.

(56) References Cited

U.S. PATENT DOCUMENTS

2003/0094816 A1* 5/2003 Kazama ............... B60K 6/32
290/40 C
2008/0018111 A1* 1/2008 Yaguchi ............... B60K 6/32
290/40 B
(Continued)

FOREIGN PATENT DOCUMENTS

JP 2010-081677 4/2010
JP 2010081677 A * 4/2010 .......... B60L 11/1816
WO WO 2011/021263 2/2011

OTHER PUBLICATIONS

Japanese Office Action for corresponding JP Application No. 2014-144193, dated Dec. 6, 2016 (w/ English machine translation).

*Primary Examiner* — Imran Mustafa
(74) *Attorney, Agent, or Firm* — Mori & Ward, LLP

(57) ABSTRACT

An electric power system includes an electric power generator, a first converter, an electric energy storage device, and a first converter controller. The first converter controller is to correct a target output of the electric power generator based on a charging margin so as to control an output of the electric power generator via the first converter so that an input electric power to the electric energy storage device does not exceed an input electric power threshold of the electric energy storage device or to correct the target output of the electric power generator based on a discharging margin so as to control the output of the electric power generator via the first converter so that an output electric power from the electric energy storage device does not exceed an output electric power threshold of the electric energy storage device.

21 Claims, 12 Drawing Sheets

(51) Int. Cl.
*G06F 17/00* (2006.01)
*B60L 11/18* (2006.01)

(56) References Cited

U.S. PATENT DOCUMENTS

2012/0146421 A1\* 6/2012 Umayahara ....... H01M 8/04365
                                                        307/80
2012/0225329 A1\* 9/2012 Kazuno ............ H01M 8/04873
                                                         429/9

\* cited by examiner

ELECTRIC POWER SYSTEM

CROSS-REFERENCE TO RELATED APPLICATIONS

The present application claims priority under 35 U.S.C. §119 to Japanese Patent Application No. 2014-144193, filed Jul. 14, 2014, entitled "Electric power system." The contents of this application are incorporated herein by reference in their entirety.

BACKGROUND

1. Field

The present disclosure relates to an electric power system.

2. Description of the Related Art

International Publication Pamphlet No. WO2011/021263 discloses an electric power generation control for a fuel cell 2 (Abstract). Specifically, an electric energy generation demand calculation unit 81 calculates an electric energy generation demand by calculating and adding: an electric energy to be supplied to a traction motor 7; an electric energy to be supplied to an auxiliary device; and an electric energy to be supplied to a battery 4 or the traction motor 7 depending on charging or discharging of the battery 4. An electric energy loss calculation unit 82 calculates an electric energy loss by referring to an electric energy loss map based on: the electric energy generation demand; and a voltage increase ratio, output voltage, and temperature in an FC converter 3. An electric energy loss addition unit 83 compensates the electric energy generation demand by adding the electric energy loss to the electric energy generation demand. An electric energy generation requesting unit 84 outputs an electric energy generation command to the fuel cell 2 so as to generate electric energy to achieve an electric energy generation demand thus compensated.

SUMMARY

According to one aspect of the present invention, an electric power system includes an electric power generator device, a first converter, a first converter controller device, and an electric energy storage device. The electric power generator device supplies an electric power to a load. The first converter is on electric power generator device side. The first converter controller device controls the first converter. The electric energy storage device supplies an electric power to the load and stores an electric power of the electric power generator device. The first converter controller device controls output of the electric power generator device by reflecting a margin during charging into a target output of the electric power generator device in such a way that an input electric power to the electric energy storage device does not exceed an input electric power threshold, or controls the output of the electric power generator device by reflecting a margin during discharging into the target output of the electric power generator device in such a way that an output electric power from the electric energy storage device does not exceed an output electric power threshold.

According to another aspect of the present invention, an electric power system includes an electric power generator, a first converter, an electric energy storage device, and a first converter controller. The electric power generator is to supply an electric power to a load. The first converter is provided to control the electric power generator. The electric energy storage device is to store an electric power from the electric power generator to supply an electric power to the load. The first converter controller is to correct a target output of the electric power generator based on a charging margin so as to control an output of the electric power generator via the first converter so that an input electric power to the electric energy storage device does not exceed an input electric power threshold of the electric energy storage device or to correct the target output of the electric power generator based on a discharging margin so as to control the output of the electric power generator via the first converter so that an output electric power from the electric energy storage device does not exceed an output electric power threshold of the electric energy storage device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
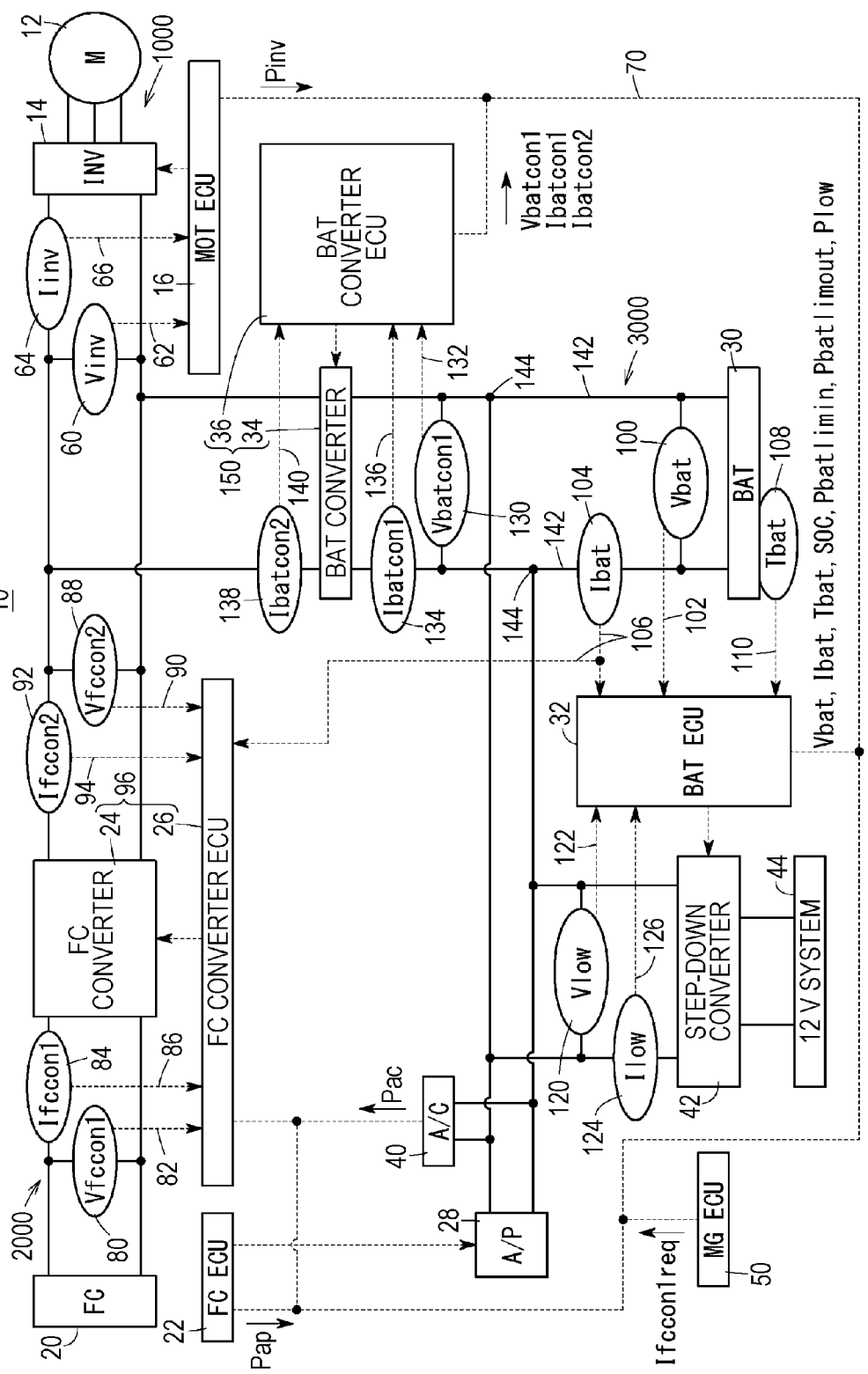
FIG. 1 is a schematic overall configuration diagram of a fuel cell vehicle that serves as an electric power system according to one embodiment of the present disclosure.

The embodiments will now be described with reference to the accompanying drawings, wherein like reference numerals designate corresponding or identical elements throughout the various drawings.

A. Embodiment

[A1. Configuration of Present Embodiment]
(A1-1. Overall Configuration)

FIG. 1 is a schematic overall configuration diagram of a fuel cell vehicle 10 (hereinafter, referred to as "FC vehicle 10" or "vehicle 10") that serves as an electric power system according to one embodiment of the present disclosure. The vehicle 10 includes, as a drive system 1000, a traction motor 12 (hereinafter, also referred to as "motor 12" or "drive motor 12"), an inverter 14, and a motor electronic controller device 16 (hereinafter, also referred to as "motor ECU 16" or "MOT ECU 16").

Further, the vehicle 10 includes, as a FC system 2000, a fuel cell stack 20 (hereinafter, referred to as "FC stack 20" or "FC 20"), a fuel cell electronic controller device 22 (hereinafter, referred to as "FC ECU 22"), a fuel cell converter 24 (hereinafter, referred to as "FC converter 24"), a FC converter electronic controller device 26 (hereinafter, referred to as "FC converter ECU 26" or "ECU 26"), and an air pump 28.

Still further, the vehicle 10 includes, as a battery system 3000, a battery 30, a battery electronic controller device 32 (hereinafter, referred to as "battery ECU 32" or "BAT ECU 32"), a battery converter 34 (hereinafter, also referred to as "BAT converter 34"), and a battery converter electronic controller device 36 (hereinafter, also referred to as "battery converter ECU 36" or "BAT converter ECU 36").

Further, the vehicle 10 includes an air conditioner 40, a step-down converter 42, a 12V system 44, and a management electronic controller device 50 (hereinafter, also referred to as "management ECU 50" or "MG ECU 50"). The air pump 28, the air conditioner 40, the step-down converter 42, and the 12V system 44 are auxiliary machinery of the vehicle 10, and are part of the load in the vehicle 10 serving as the electric power system.

(A1-2. Drive System 1000)
(A1-2-1. Traction Motor 12)

The motor 12 of the present embodiment is of a three-phase alternating-current brushless type. The motor 12 generates a drive force from an electric power supplied from the FC 20 and the battery 30, and uses this drive force to rotate vehicle wheels (not illustrated) via a transmission (not illustrated). Further, the motor 12 outputs an electric power (regenerated power Preg) [W] produced by regeneration to the battery 30 and the like.

(A1-2-2. Inverter 14)

The inverter 14 has a three-phase full bridge configuration and performs a direct-current-to-alternating-current conversion. Specifically, the inverter 14 converts the direct-current to the three-phase alternating-current and supplies to the motor 12. Further, the inverter 14 supplies a direct current that has been converted by alternating-current-to-direct-current conversion associating with regenerative operations to the battery 30 and the like via the battery converter 34. The motor 12 and the inverter 14 are main machinery of the vehicle 10, and are part of the load in the vehicle 10 serving as the electric power system.

An input terminal voltage Vinv of the inverter 14 (hereinafter, referred to as "inverter voltage Vinv") is detected with a voltage sensor 60 and outputted to the motor ECU 16 via a signal line 62. An input terminal current Iinv of the inverter 14 (hereinafter, referred to as "inverter current Iinv") is detected with a current sensor 64 and outputted to the motor ECU 16 via a signal line 66.

(A1-2-3. Motor ECU 16)

The motor ECU 16 controls the motor 12 and the inverter 14 based on an input value (input parameter) such as a command value from the management ECU 50 and the like. Further, the motor ECU 16 outputs the inverter voltage Vinv, the inverter current Iinv, an inverter electric power Pinv, and the like to a communication network 70. The inverter electric power Pinv is an input terminal electric power of the inverter 14 and calculated by multiplying the inverter voltage Vinv by the inverter current Iinv. In the present embodiment, the communication network 70 is a controller area network (CAN). Hereinafter, the communication network 70 is also referred to as CAN 70.

The motor ECU 16 includes input/output devices, a processor, and a storage device, which are not illustrated. Other ECUs are similarly configured.

(A1-3. FC System 2000)
(A1-3-1. FC Stack 20)

The FC stack 20 has, for example, a structure in which fuel cells are stacked and each fuel cell is formed by interposing a solid polymer electrolyte membrane between an anode electrode and a cathode electrode. An anode system, a cathode system, a cooling system, and the like are placed in the vicinity of the FC stack 20. The anode system supplies and exhausts hydrogen (fuel gas) to and from the anode of the FC stack 20. The cathode system supplies and exhausts air including oxygen (oxidant gas) to and from the cathode of the FC stack 20. The cooling system cools the FC stack 20. In FIG. 1, except the air pump 28 and the FC ECU 22, the anode system, the cathode system, and the cooling system are not illustrated.

(A1-3-2. FC ECU 22)

The FC ECU 22 controls general operations of electric power generation at the FC 20 such as supplying of hydrogen and oxygen to the FC 20 and the like based on an input value (input parameter) such as a command value from the management ECU 50 and the like. In other words, the FC ECU 22 controls the anode system, the cathode system, and the cooling system. The FC ECU 22 transmits an electric power consumption Pap [W] of the air pump 28 to the management ECU 50, the FC converter ECU 26, and the like via the CAN 70.

(A1-3-3. FC Converter 24)

The FC converter 24 is a booster chopper type voltage converter device (DC/DC converter) that increases the output voltage of the FC 20 (hereinafter, referred to as "FC voltage Vfc") and supplies to the inverter 14. The FC converter 24 is arranged between the FC 20 and the inverter 14. In other words, the FC converter 24 is connected to a primary side where the FC 20 is located at one side and connected to a secondary side that is a connecting point of the inverter 14 and the battery 30 at the other side.

A primary-side voltage Vfccon1 of the FC converter 24 is detected with a voltage sensor 80 and outputted to the FC converter ECU 26 via a signal line 82. A primary-side current Ifccon1 of the FC converter 24 is detected with a current sensor 84 and outputted to the FC converter ECU 26 via a signal line 86. A secondary-side voltage Vfccon2 of the FC converter 24 is detected with a voltage sensor 88 and outputted to the FC converter ECU 26 via a signal line 90. A secondary-side current Ifccon2 of the FC converter 24 is detected with a current sensor 92 and outputted to the FC converter ECU 26 via a signal line 94.

(A1-3-4. FC Converter ECU 26)

The FC converter ECU 26 controls the FC 20 via the FC converter 24 based on an input value (input parameter) such as a command value from the management ECU 50 and the like. In the following section, the FC converter 24 and the FC converter ECU 26 are also referred to as "FC VCU 96" in the meaning of a voltage control unit for the FC 20.

The input parameters to the FC converter ECU 26 include ones that are directly inputted to the FC converter ECU 26 and ones that are inputted via the communication network 70. In the present embodiment, the input parameters that are directly inputted to the FC converter ECU 26 include an input/output terminal current Ibat of the battery 30 detected with a current sensor 104, which will be described in the following section.

(A1-4. Battery System 3000)

(A1-4-1. Battery 30)

The battery 30 is an electric energy storage device (energy storage) including a plurality of battery cells, and may utilize, for example, a lithium-ion secondary battery, a nickel-hydrogen secondary battery, and the like. In the present embodiment, the lithium-ion secondary battery is used. Alternatively, an electric energy storage device such as a capacitor may be used in place of the battery 30.

An input/output terminal voltage of the battery 30 (hereinafter, referred to as "BAT terminal voltage Vbat") [V] is detected with a voltage sensor 100 and outputted to the battery ECU 32 via a signal line 102. An input/output terminal current of the battery 30 (hereinafter, referred to as "BAT terminal current Ibat") [A] is detected with a current sensor 104 and outputted to the FC converter ECU 26 and the battery ECU 32 via a signal line 106. A temperature of the battery 30 (hereinafter, also referred to as "battery temperature Tbat") [degrees C.] is detected with a temperature sensor 108 and outputted to the battery ECU 32 via a signal line 110.

(A1-4-2. Battery ECU 32)

The battery ECU 32 controls the battery 30 based on an input value (input parameter) such as a command value from the management ECU 50 and the like. The battery ECU 32 calculates the remaining capacity of the battery 30 (hereinafter, referred to as "SOC" or "battery SOC") [percentage] based on the BAT terminal voltage Vbat and the BAT terminal current Ibat for use in managing the battery 30.

For example, the battery ECU 32 calculates an input limit value Pbatlimin (hereinafter, also referred to as "BAT terminal input limit value Pbatlimin") [W] and an output limit value Pbatlimout (hereinafter, also referred to as "BAT terminal output limit value Pbatlimout") [W] of the battery 30 based on the battery temperature Tbat and the SOC. Hereinafter, the input limit value Pbatlimin and the output limit value Pbatlimout may also be referred to as BAT terminal electric power limit values Pbatlimin and Pbatlimout, BAT terminal limit values Pbatlimin and Pbatlimout, or limit values Pbatlimin and Pbatlimout. Setting of the BAT terminal limit values Pbatlimin and Pbatlimout may be performed, for example, by using a method similar to that disclosed in International Publication Pamphlet No. WO2006/006293 (see, FIG. 2 and FIG. 3 of the Pamphlet), the entire contents of which are incorporated herein by reference.

Further, the battery ECU 32 of the present embodiment controls the step-down converter 42 based on an input value (input parameter) such as a command value from the management ECU 50 and the like. An input terminal voltage of the step-down converter 42 (hereinafter, referred to as "step-down converter terminal voltage Vlow") is detected with a voltage sensor 120 and outputted to the battery ECU 32 via a signal line 122. An input terminal current of the step-down converter 42 (hereinafter, referred to as "step-down converter terminal current Ilow") is detected with a current sensor 124 and outputted to the battery ECU 32 via a signal line 126. The battery ECU 32 calculates a step-down converter terminal electric power Plow (hereinafter, also referred to as "step-down converter electric power consumption Plow") [W] by multiplying the step-down converter terminal voltage Vlow by the step-down converter terminal current Ilow.

The battery ECU 32 transmits the BAT terminal voltage Vbat, the BAT terminal current Ibat, the battery temperature Tbat, the battery SOC, the BAT terminal input limit value Pbatlimin, the BAT terminal output limit value Pbatlimout, and the step-down converter terminal electric power Plow to the MG ECU 50, the FC converter ECU 26, and the like via the CAN 70.

(A1-4-3. Battery Converter 34)

The battery converter 34 is a booster chopper type voltage converter device (DC/DC converter). In other words, the battery converter 34 increases the output voltage (BAT terminal voltage Vbat) of the battery 30 and supplies to the inverter 14. Further, the battery converter 34 reduces a regenerated voltage of the motor 12 (hereinafter, referred to as "regenerated voltage Vreg") or the secondary-side voltage Vfccon2 of the FC converter 24, and supplies to the battery 30.

The BAT converter 34 is arranged between the battery 30 and the inverter 14. In other words, the BAT converter 34 is connected to a primary side where the battery 30 is located at one side and connected to a secondary side that is a connecting point of the FC 20 and the inverter 14 at the other side.

A primary-side voltage Vbatcon1 of the BAT converter 34 is detected with a voltage sensor 130 and outputted to the BAT converter ECU 36 via a signal line 132. A primary-side current Ibatcon1 of the BAT converter 34 is detected with a current sensor 134 and outputted to the BAT converter ECU 36 via a signal line 136. A secondary-side current Ibatcon2 of the BAT converter 34 is detected with a current sensor 138 and outputted to the BAT converter ECU 36 via a signal line 140.

The primary-side voltage Vbatcon1 is a voltage across electric power lines 142 connecting the battery 30 and the BAT converter 34 at a point closer to the BAT converter 34 than a connecting point 144 for the auxiliary machinery. Similarly, the primary-side current Ibatcon1 is a current that flows through the electric power line 142 connecting the battery 30 and the BAT converter 34 at a point closer to the BAT converter 34 than the connecting point 144 for the auxiliary machinery. In a case where no auxiliary machinery (air pump 28 and the like) is connected to the electric power line 142, one of the voltage sensors 100 and 130 and one of the current sensors 104 and 134 may be omitted.

(A1-4-4. Battery Converter ECU 36)

The BAT converter ECU 36 controls the BAT converter 34 based on an input value (input parameter) such as a command value from the management ECU 50 and the like. Hereinafter, the BAT converter 34 and the BAT converter ECU 36 are also referred to as "BAT VCU" in the meaning of a voltage control unit for the battery 30.

The BAT converter ECU 36 transmits the primary-side voltage Vbatcon1, the primary-side current Ibatcon1, and the secondary-side current Ibatcon2 to the MG ECU 50, the FC converter ECU 26, and the like via the CAN 70.

(A1-5. Auxiliary Machinery)

As described above, in the present embodiment, for example, the air pump 28, the air conditioner 40, the step-down converter 42 (step-down type DC-DC converter), and the 12V system 44 are included as the auxiliary machinery. In addition to the above, a water pump (not illustrated)

may also be part of the auxiliary machinery. The water pump is included in the cooling system of the FC system 2000 and circulates water as a cooling medium for cooling the FC 20.

The air conditioner 40 adjusts the temperature inside the vehicle 10 and the like. An electric power consumption Pac [W] of the air conditioner 40 is transmitted from a controller device of the air conditioner 40, which is not illustrated, to the MG ECU 50, the FC converter ECU 26, and the like via the CAN 70.

The step-down converter 42 reduces the voltage of the BAT converter 34 (BAT VCU 150) at the primary-side and supplies to the 12V system 44. The 12V system includes a 12V battery, accessories, a radiator fan, headlights, and the like, which are not illustrated. The accessories include equipment such as audio equipment, a navigation device, and the like. The radiator fan is a fan for cooling the cooling medium, which is circulated by the water pump, at a radiator.

(A1-6. Management ECU 50)

The management ECU 50 transmits command values (output parameters) to the MOT ECU 16, the FC ECU 22, the FC converter ECU 26, the BAT ECU 32, the BAT converter ECU 36, and the like via the communication network 70 (FIG. 1). In this way, the motor 12, the inverter 14, the FC 20, the FC converter 24, the battery 30, the BAT converter 34, and the auxiliary machinery are controlled. During this control, the MG ECU 50 executes a program stored in a memory unit, which is not illustrated. Further, the MG ECU 50 uses detected values of various sensors such as the voltage sensors 60, 80, 88, 100, 120, 130, the current sensors 64, 84, 92, 104, 124, 134, 138, and the like.

Here, the various sensors includes, in addition to the foregoing sensors, an accelerator pedal operation amount sensor (hereinafter, referred to as "AP operation amount sensor"), and a motor rotation count sensor, and a vehicle wheel speed sensor. The motor rotation count sensor and the wheel speed sensor are not illustrated. The AP operation amount sensor detects an operated amount [percentage] of an accelerator pedal, which is not illustrated. The motor rotation count sensor counts the number of rotations of the motor 12 (hereinafter, referred to as "motor rotation count Nmot" or "rotation count Nmot") [rpm]. The MG ECU 50 detects a vehicle speed V [km/h] of the FC vehicle 10 using the rotation count Nmot. The wheel speed sensor detects the speed (vehicle wheel speed) of each wheel, which is not illustrated.

The MG ECU 50 calculates a load (total load) needed for the whole FC vehicle 10 based on the state of the FC stack 20, the state of the battery 30, and the state of the motor 12 as well as inputs (load demands) from various switches and the various sensors. Further, the MG ECU 50 mediates and determines allocations (shares) of the total load between a load (FC load) to be shared by the FC stack 20, a load (battery load) to be shared by the battery 30, and a load (regeneration load) to be shared by a regeneration power supply (motor 12). Further, in accordance with the respective loads, the MG ECU 50 transmits command values to the MOT ECU 16, the FC ECU 22, the FC converter ECU 26, the BAT ECU 32, the BAT converter ECU 36, and the like.

The command values transmitted from the MG ECU 50 to the FC converter ECU 26 include a request value for the primary-side current Ifccon1 of the FC converter 24 (hereinafter, referred to as "requested primary-side current Ifccon1req"). The requested primary-side current Ifccon1req may also be interpreted as a request value for the output current of the FC 20. In other words, the requested primary-side current Ifccon1req represents the load to be shared by the FC 20 (namely, a target output of the FC 20).

[A2. Controls of Present Embodiment]

Next, mainly, controls of the FC converter 24 (FC converter control) performed by the FC converter ECU 26 are described.

(A2-1. Outline of FC Converter Control)

Figure 2:
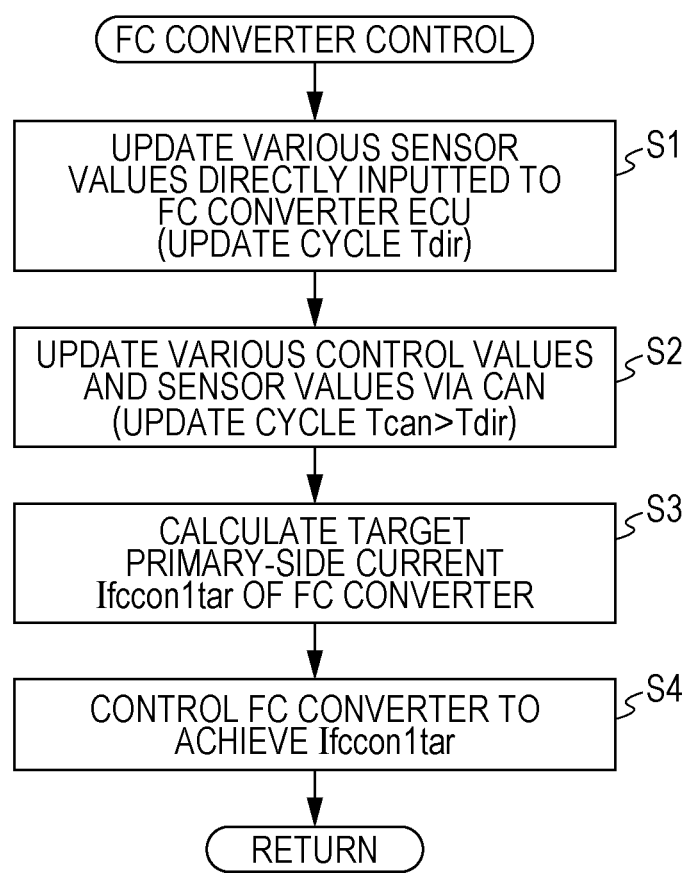
FIG. 2 is a flowchart of fuel cell (FC) converter control (FC converter control) by a FC converter electronic controller device in the foregoing embodiment.

FIG. 2 is a flowchart of the control of the FC converter 24 (FC converter control) by the FC converter ECU 26 in the present embodiment. At step S1, the FC converter ECU 26 updates various sensor values Mdir (parameters) that are directly inputted to the FC converter ECU 26.

Here, the various sensor values Mdir includes the FC converter primary-side voltage Vfccon1 from the voltage sensor 80, the FC converter primary-side current Ifccon1 from the current sensor 84, and the FC converter secondary-side voltage Vfccon2 from the voltage sensor 88. Further, in the present embodiment, the current sensor 104 is directly connected to the FC converter ECU 26 (FIG. 1). Thus, the BAT terminal current Ibat is also included in the sensor values Mdir.

An update cycle Tdir of the sensor values Mdir is, for example, several milliseconds. The update cycle Tdir may be varied for different sensor values Mdir.

At step S2, the FC converter ECU 26 updates various control values Ccan and sensor values Mcan (parameters) that are inputted via the CAN 70. Here, the control values Ccan include, for example, the requested primary-side current Ifccon1req of the FC converter 24 as well as the input limit value Pbatlimin and the output limit value Pbatlimout of the battery 30. Further, the sensor values Mcan include the inverter electric power Pinv, the air conditioner electric power consumption Pac, the air pump electric power consumption Pap, the step-down converter electric power consumption Plow, the BAT terminal voltage Vbat, the primary-side voltage Vbatcon1, the primary-side current Ibatcon1, and the secondary-side current Ibatcon2 of the BAT converter 34.

An update cycle Tcan for the control values Ccan and the sensor values Mcan is, for example, several tens of milliseconds, and is longer than the update cycle Tdir at step S1. The update cycle Tcan may be varied for different control values Ccan or different sensor values Mcan. In the present embodiment, an operation cycle from step S1 to S4 of FIG. 2 (hereinafter, referred to as "first control cycle Tc1" or "control cycle Tc1") is, for example, several milliseconds, and is equal to the update cycle Tdir of the sensor values Mdir. For example, from a viewpoint of shortening the update cycle Tdir and the control cycle Tc1 compared to the update cycle Tcan, the control cycle Tc1 may be made shorter or longer than the update cycle Tdir.

At step S3, the FC converter ECU 26 calculates a target primary-side current Ifccon1tar of the FC converter 24 based on the control values Ccan (including the requested primary-side current Ifccon1req) and the sensor values Mdir and Mcan. For example, the larger an electric power consumption Paux of the auxiliary machinery becomes, the higher value the ECU26 sets for an upper limit value of the target primary-side current Ifccon1tar.

At step S4, the ECU 26 controls the FC converter 24 so as to achieve the target primary-side current Ifccon1tar thus calculated at step S3. Specifically, in the case where the primary-side current Ifccon1 is less than the target primary-side current Ifccon1tar, a drive duty ratio with regard to the FC converter 24 is increased. In the case where the primary-side current Ifccon1 is larger than the target primary-side current Ifccon1tar, the drive duty ratio with regard to the FC converter 24 is decreased. In the case where the primary-side current Ifccon1 is equal to the target primary-side current Ifccon1tar, the present drive duty ratio with regard to the FC converter 24 is maintained.

(A2-2. FC Converter Passing Electric Power Switch Control)

(A2-2-1. Outline of FC Converter Passing Electric Power Switch Control)

In the present embodiment, from a viewpoint of protecting the battery 30, the FC converter passing electric power switch control that switches passing electric power of the FC converter 24 (namely, a secondary-side electric power Pfccon2 (or a primary-side electric power Pfccon1)) is performed.

Figure 3:
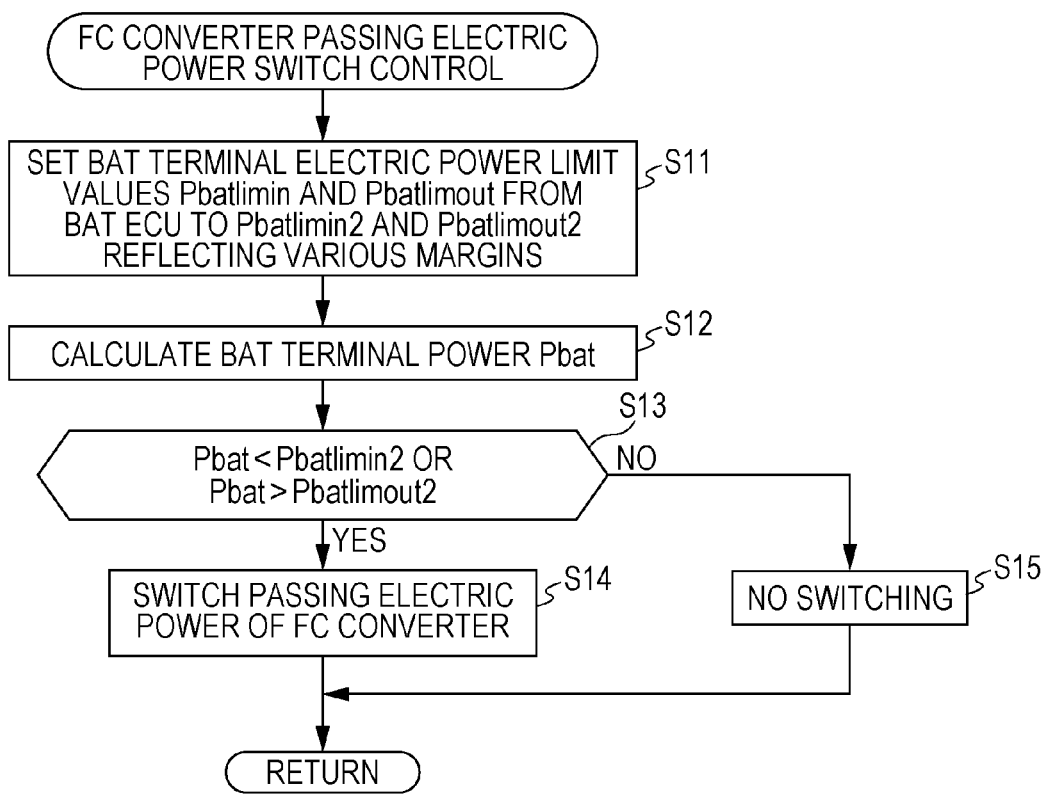
FIG. 3 is a flowchart of FC converter passing electric power switch control in the foregoing embodiment.

FIG. 3 is a flowchart of the FC converter passing electric power switch control in the present embodiment. In the FC converter passing electric power switch control, the control values Ccan and the sensor values Mdir and Mcan obtained at steps S1 and S2 of FIG. 2 are used. Further, an operation cycle from step S11 to S15 of FIG. 3 (hereinafter, referred to as "second control cycle Tc2" or "control cycle Tc2") is, for example, several milliseconds, and is equal to the update cycle Tdir of the sensor values Mdir and the first control cycle Tc1. For example, from a viewpoint of shortening the update cycle Tdir, the first control cycle Tc1 and the second control cycle Tc2 compared to the update cycle Tcan, the second control cycle Tc2 may be made shorter or longer than the update cycle Tdir.

At step S11, the ECU 26 sets compensated BAT terminal electric power limit values Pbatlimin2 and Pbatlimout2 that reflect various margins Pmaraux1, Pmardey1, Pmaraux2, Pmardey2, and Pmarfccon1 into the BAT terminal electric power limit values Pbatlimin and Pbatlimout obtained from the BAT ECU 32 via the CAN 70. Hereinafter, the compensated BAT terminal electric power limit value Pbatlimin2 is also referred to as compensated BAT terminal input limit value Pbatlimin2 or compensated limit value Pbatlimin2. Further, the compensated BAT terminal electric power limit value Pbatlimout2 is also referred to as compensated BAT terminal output limit value Pbatlimout2 or compensated limit value Pbatlimout2. Step S11 will be described in detail with reference to FIG. 4 and FIG. 5.

At step S12, the ECU 26 calculates an input/output terminal voltage of the battery 30 (hereinafter, referred to as "BAT terminal electric power Pbat") by multiplying the BAT terminal voltage Vbat obtained from the BAT ECU 32 via the CAN 70 by the BAT terminal current Ibat directly obtained from the current sensor 104. Alternatively, the BAT terminal electric power Pbat may be calculated at the BAT ECU 32 and transmitted via the CAN 70.

At step S13, the ECU 26 determines whether the BAT terminal electric power Pbat falls below the compensated limit value Pbatlimin2 or not (in other words, whether the absolute value of the BAT terminal electric power Pbat exceeds the absolute value of the compensated limit value Pbatlimin2 or not) and whether the BAT terminal electric power Pbat exceeds the compensated limit value Pbatlimout2 or not.

In the case where the BAT terminal electric power Pbat falls below the compensated limit value Pbatlimin2 or exceeds the compensated limit value Pbatlimout2 (step S13: YES), the ECU 26 switches the passing electric power (namely, the secondary-side electric power Pfccon2) of the FC converter 24 at step S14. For example, the ECU 26 lowers a boosting rate of the FC converter 24 to reduce the secondary-side electric power Pfccon2 until the BAT terminal electric power Pbat does not fall below the compensated limit value Pbatlimin2. Alternatively, the ECU 26 raises the boosting rate of the FC converter 24 to increase the secondary-side electric power Pfccon2 until the BAT terminal electric power Pbat does not exceed the compensated limit value Pbatlimout2.

In the case where the BAT terminal electric power Pbat does not fall below the compensated limit value Pbatlimin2 and does not exceed the compensated limit value Pbatlimout2 (step S13: NO), the ECU 26 determines not to limit the passing electric power (secondary-side electric power Pfccon2) of the FC converter 24 at step S15.

(A2-2-2. Setting of Compensated BAT Terminal Input Limit Value Pbatlimin2)

Figure 4:
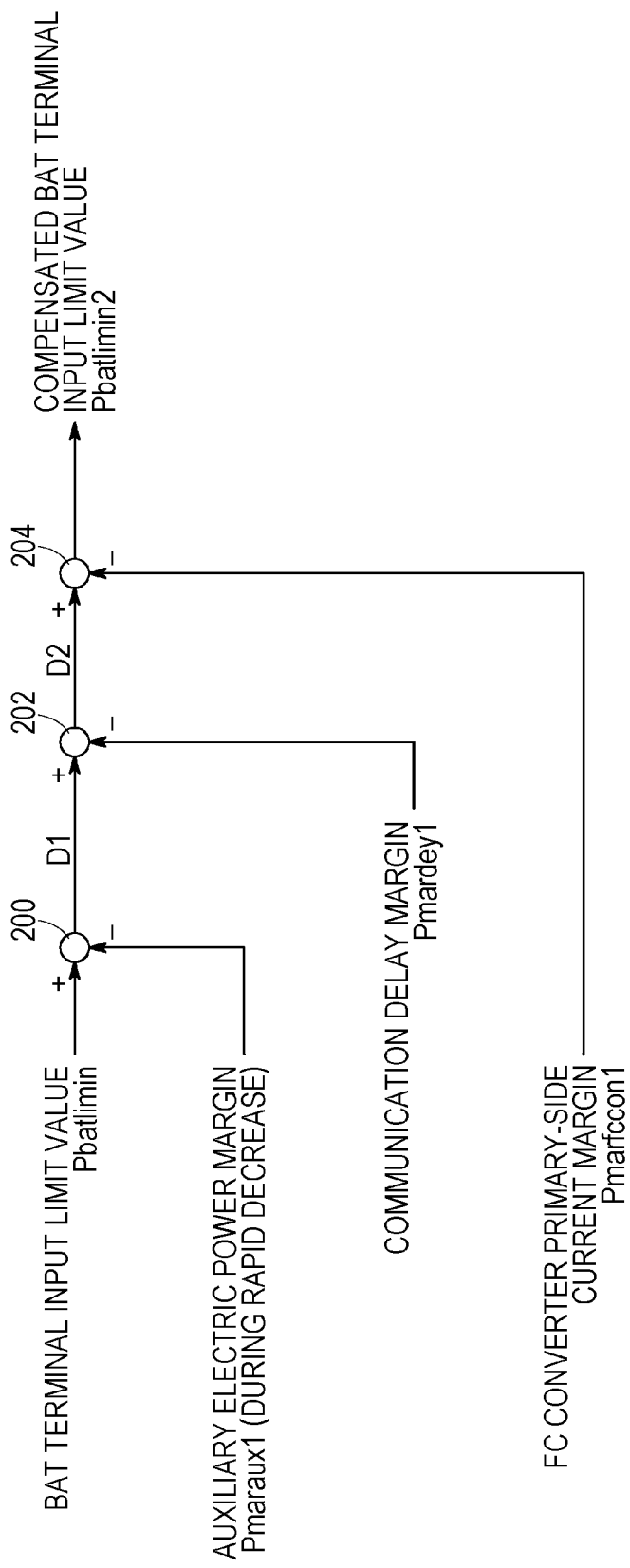
FIG. 4 is a diagram depicting setting of a compensated BAT terminal input limit value in the foregoing embodiment.
Figure 5:
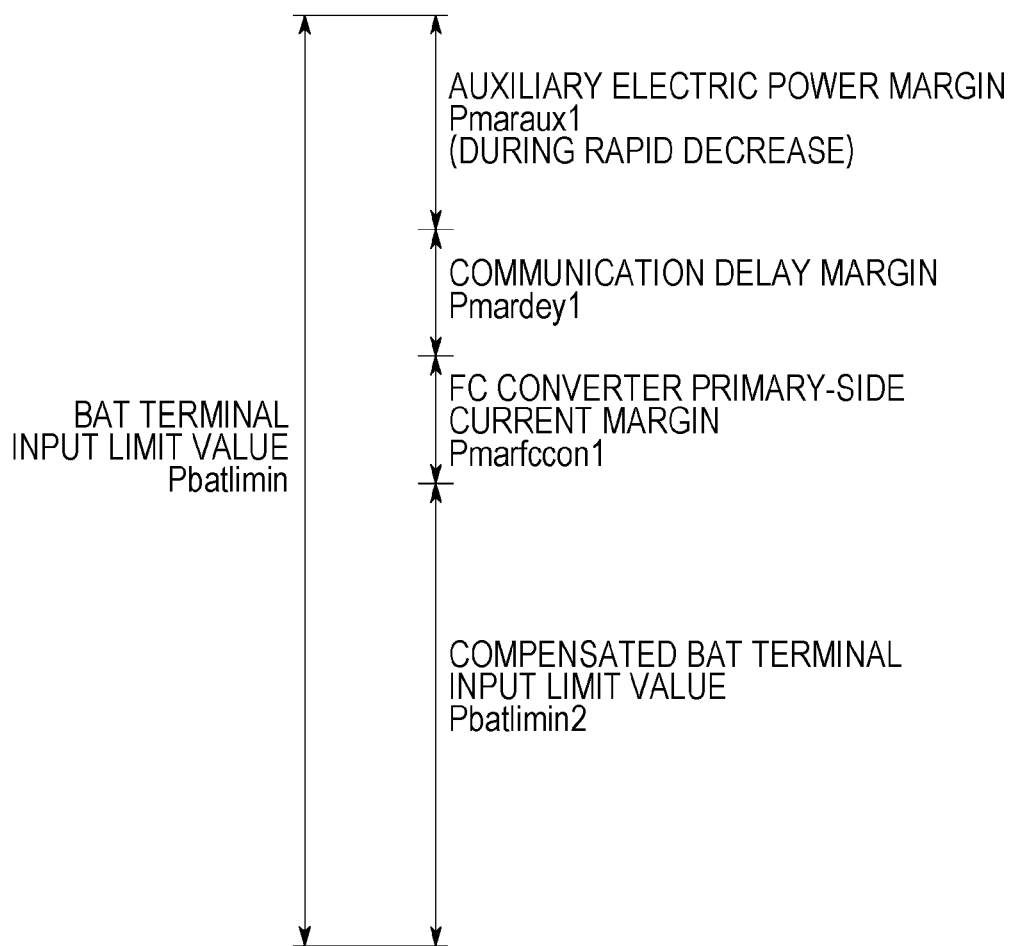
FIG. 5 is a diagram depicting a relationship between the compensated BAT terminal input limit value and values used for its calculation in the foregoing embodiment.

FIG. 4 is a diagram depicting setting of the compensated BAT terminal input limit value Pbatlimin2 in the present embodiment. FIG. 5 is a diagram depicting a relationship between the compensated BAT terminal input limit value Pbatlimin2 and values used for its calculation in the present embodiment.

At a subtractor 200 of FIG. 4, the ECU 26 subtracts the margin Pmaraux1 (hereinafter, also referred to as "auxiliary machinery electric power margin Pmaraux1") from the BAT terminal input limit value Pbatlimin and outputs a different D1. The margin Pmaraux1 is a margin to be set in consideration of a rapid decrease in the electric power consumption Paux of the auxiliary machinery that could occur within the control cycle Tc2 (or Tc1). In the present embodiment, the margin Pmaraux1 is a fixed value and determined based on an experimental value or a simulation value.

At a subtractor 202 of FIG. 4, the ECU 26 subtracts the margin Pmardey1 (hereinafter, also referred to as "communication delay margin Pmardey1") from the difference D1 (=Pbatlimin−Pmaraux1) and outputs a different D2.

The margin Pmardey1 is a margin to be set in consideration of a communication delay time Tdey. In other words, the margin Pmardey1 is a margin to be set in consideration of a rapid decrease in the output of the motor 12 or the auxiliary machinery that could occur within the update cycle Tcan (in other words, the communication delay time Tdey). In the present embodiment, the margin Pmardey1 is a fixed value and determined based on an experimental value or a simulation value.

At a subtractor 204 of FIG. 4, the ECU 26 subtracts the margin Pmarfccon1 (hereinafter, also referred to as "FC converter primary-side current margin Pmarfccon1") from the difference D2 (=Pbatlimin−Pmaraux1−Pmardey1) and outputs the compensated limit value Pbatlimin2. The margin Pmarfccon1 is a margin to be set in consideration of the primary-side current Ifccon1 (passing current) of the FC converter 24. In the present embodiment, the margin Pmarfccon1 is a variable, and a calculation method thereof will be described in detail with reference to FIG. 8 and FIG. 9.

As described above, the compensated BAT terminal input limit value Pbatlimin2 is obtained by subtracting three kinds of margins Pmaraux1, Pmardey1, and Pmarfccon1 from the BAT terminal input limit value Pbatlimin (see also FIG. 5).

(A2-2-3. Setting of Compensated BAT Terminal Output Limit Value Pbatlimout2)

Figure 6:
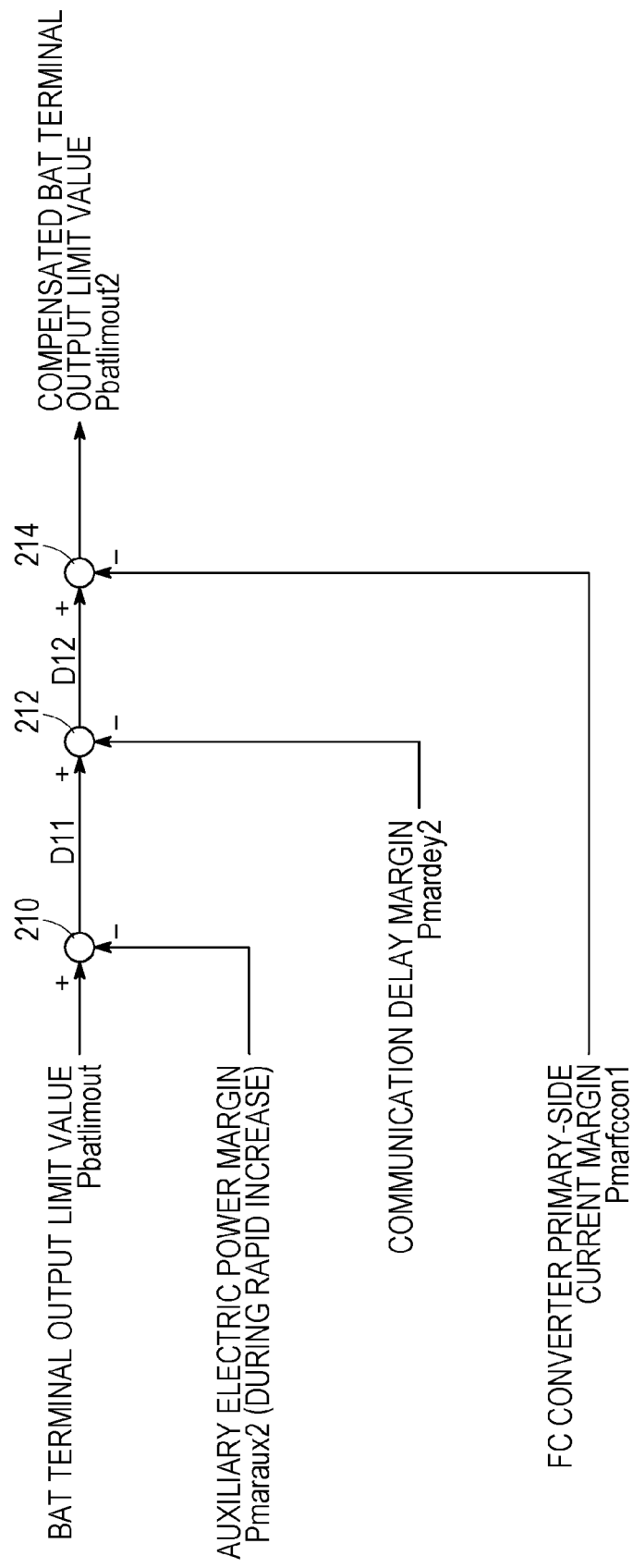
FIG. 6 is a diagram depicting setting of a compensated BAT terminal output limit value in the foregoing embodiment.
Figure 7:
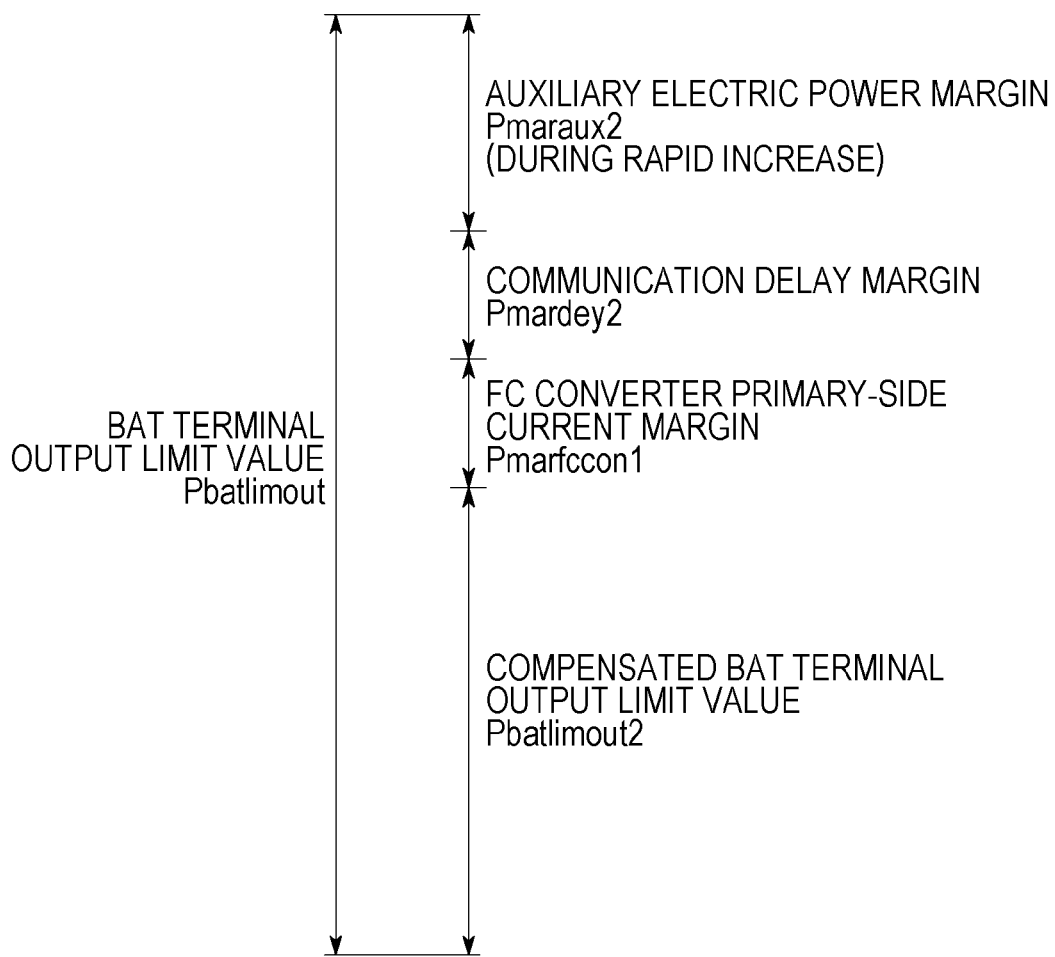
FIG. 7 is a diagram depicting a relationship between the compensated BAT terminal output limit value and values used for its calculation in the foregoing embodiment.

FIG. 6 is a diagram depicting setting of the compensated BAT terminal output limit value Pbatlimout2 in the present embodiment. FIG. 7 is a diagram depicting a relationship between the compensated BAT terminal output limit value Pbatlimout2 and values used for its calculation in the present embodiment.

At a subtractor 210 of FIG. 6, the ECU 26 subtracts the margin Pmaraux2 (hereinafter, also referred to as "auxiliary machinery electric power margin Pmaraux2") from the BAT terminal output limit value Pbatlimout and outputs a different D11. The margin Pmaraux2 is a margin to be set in consideration of a rapid increase in the electric power consumption Paux of the auxiliary machinery that could occur within the control cycle Tc2 (or Tc1). In the present embodiment, the margin Pmaraux2 is a fixed value and determined based on an experimental value or a simulation value.

At a subtractor 212 of FIG. 6, the ECU 26 subtracts the margin Pmardey2 (hereinafter, also referred to as "communication delay margin Pmardey2") from the difference D11 (=Pbatlimout−Pmaraux2) and outputs a difference D12. In other words, the margin Pmardey2 is a margin to be set in consideration of a rapid increase in the output of the motor 12 or the auxiliary machinery that could occur within the update cycle Tcan (in other words, the communication delay time Tdey). In the present embodiment, the margin Pmardey2 is a fixed value and determined based on an experimental value or a simulation value.

At a subtractor 214 of FIG. 6, the ECU 26 subtracts the FC converter primary-side current margin Pmarfccon1 from the difference D12 (=Pbatlimout−Pmaraux2−Pmardey2) and outputs the compensated limit value Pbatlimout2. Here, a plus/minus sign of the margin Pmarfccon1 is reversed from the one used in the setting of the compensated limit value Pbatlimin2. Alternatively, a margin Pmarfccon1 different from the one used in the setting of the compensated limit value Pbatlimin2 may be used.

As described above, the compensated BAT terminal output limit value Pbatlimout2 is obtained by subtracting three kinds of margins Pmaraux2, Pmardey2, and Pmarfccon1 from the BAT terminal output limit value Pbatlimout (see also FIG. 7).

(A2-2-4. Setting of FC Converter Primary-Side Current Margin Pmarfccon1)

Figure 8:
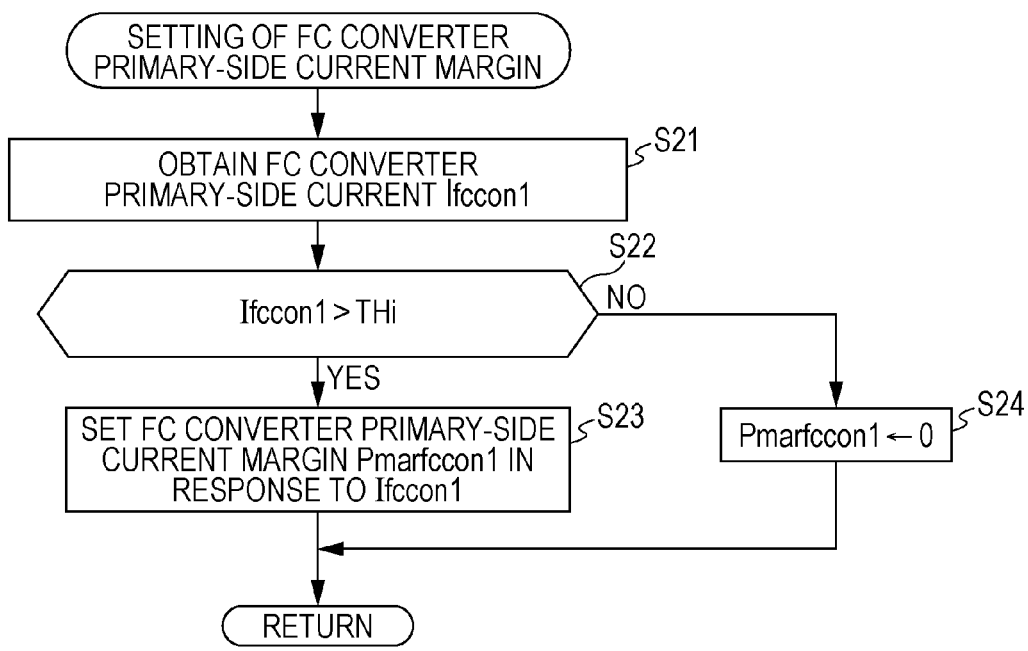
FIG. 8 is a flowchart for setting a FC converter primary-side current margin in the foregoing embodiment.

FIG. 8 is a flowchart for setting the FC converter primary-side current margin Pmarfccon1 in the present embodiment. At step S21, the ECU 26 obtains the primary-side current Ifccon1 of the FC converter 24. As described above, the primary-side current Ifccon1 is the sensor value Mdir directly inputted to the ECU 26 from the current sensor 84.

At step S22, the ECU 26 determines whether the primary-side current Ifccon1 exceeds a predetermined current threshold THi (hereinafter, also referred to as "threshold THi") or not. The threshold THi is a threshold for determining, for example, whether the output of the FC 20 can influence the over-charging or the over-discharging of the battery 30.

In the case where the primary-side current Ifccon1 exceeds the threshold THi (step S22: YES), the ECU 26 sets the primary-side current margin Pmarfccon1 of the FC converter 24 in response to the primary-side current Ifccon1 at step S23. Alternatively, the determination at step S22 may be omitted, and the process may proceed directly to step S23 after step S21.

Figure 9:
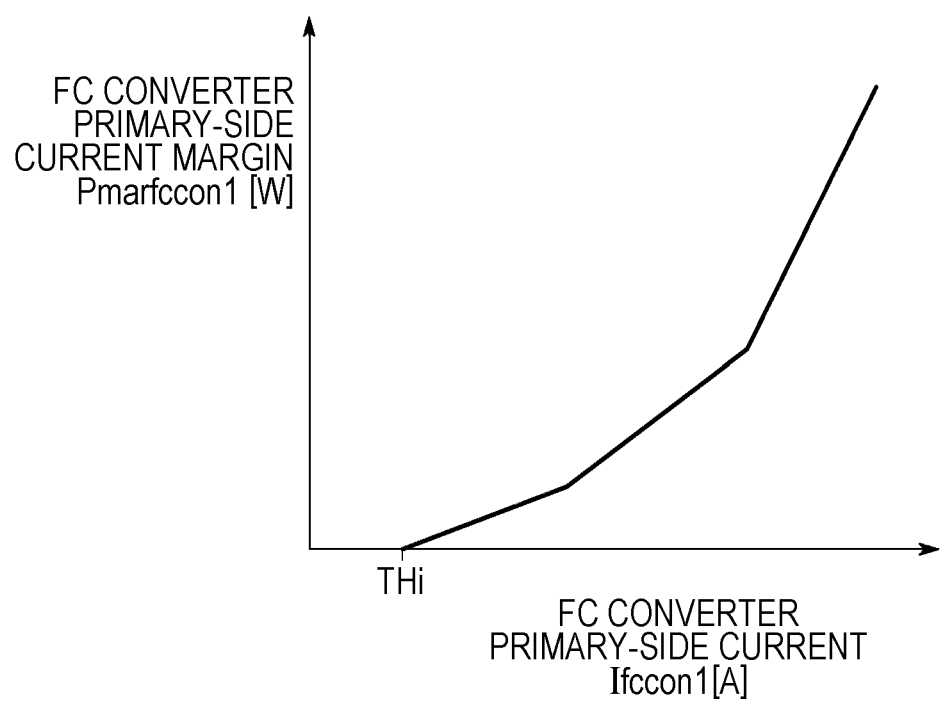
FIG. 9 is a diagram depicting a relationship between primary-side current of the FC converter and the FC converter primary-side current margin in the foregoing embodiment.

FIG. 9 is a diagram depicting a relationship between the primary-side current Ifccon1 of the FC converter 24 and the margin Pmarfccon1 in the present embodiment. As depicted in FIG. 9, in the case where the primary-side current Ifccon1 exceeds the threshold THi, the margin Pmarfccon1 increases in response to an increase in the primary-side current Ifccon1.

This reduces absolute values of the compensated limit values Pbatlimin2 and Pbatlimout2 relative to absolute values of the limit values Pbatlimin and Pbatlimout. As a result, the battery 30 may be protected even in a case where the primary-side current Ifccon1 largely changes within the control cycle Tc2 (or Tc1).

In the case where the primary-side current Ifccon1 does not exceed the threshold THi (step S22: NO), the ECU 26 sets the margin Pmarfccon1 to zero at step S24. In other words, the ECU 26 does not use the margin Pmarfccon1 in the setting of the compensated limit values Pbatlimin2 and Pbatlimout2.

(A2-2-5. Specific Example)

Figure 10:
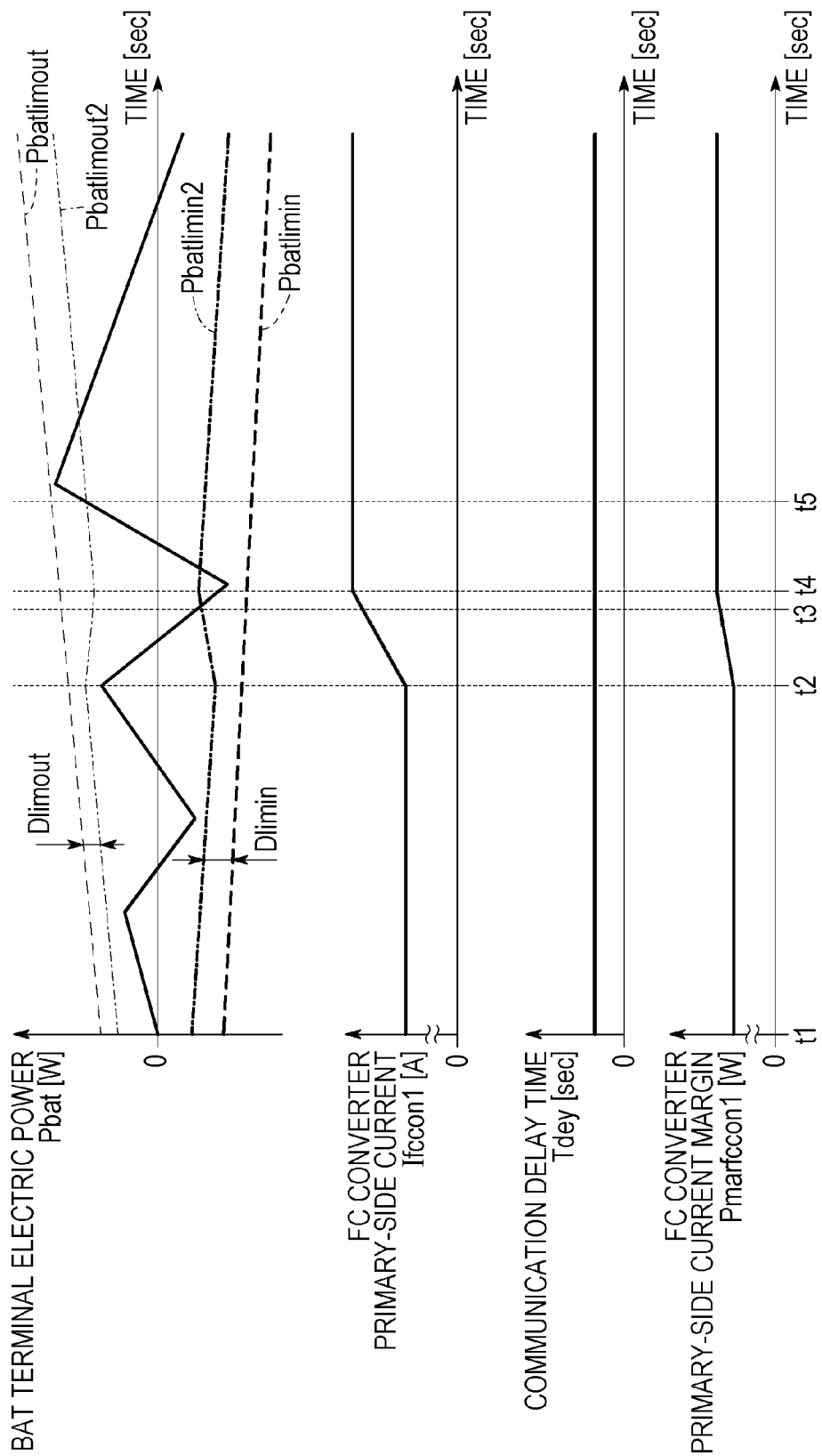
FIG. 10 is a time chart depicting an example in which the FC converter passing electric power switch control in the foregoing embodiment is used.

FIG. 10 is a time chart depicting an example in which the FC converter passing electric power switch control is used in the present embodiment. Between time t1 and t2 of FIG. 10, the primary-side current Ifccon1 of the FC converter 24 is constant. Accordingly, a difference Dlimin between the limit value Pbatlimin and the compensated limit value Pbatlimin2 is constant, and a difference Dlimout between the limit value Pbatlimout and the compensated limit value Pbatlimout2 is also constant.

Between time t2 and t4 of FIG. 10, the primary-side current Ifccon1 of the FC converter 24 is increasing. This increase is accompanied with an increase in the FC converter primary-side current margin Pmarfccon1 (FIG. 9). Thus, the compensated limit value Pbatlimin2 increases (decreases in the absolute value), and the compensated limit value Pbatlimout2 decreases.

At time t3, the BAT terminal electric power Pbat exceeds the compensated limit value Pbatlimin2 (or falls below) (step S13 of FIG. 3: YES). With this, the ECU 26 switches (or lowers) the passing electric power (secondary-side electric power Pfccon2) of the FC converter 24 (step S14). As a result, the BAT terminal electric power Pbat is prevented from exceeding the BAT terminal input limit value Pbatlimin.

Similarly, at time t5, the BAT terminal electric power Pbat exceeds the compensated limit value Pbatlimout2 (step S13 of FIG. 3: YES). With this, the ECU 26 switches (or raises) the passing electric power (secondary-side electric power Pfccon2) of the FC converter 24 (step S14). As a result, the BAT terminal electric power Pbat is prevented from exceeding the BAT terminal output limit value Pbatlimout.

[A3. Effects of Present Embodiment]

As described above, according to the present embodiment, the output of the FC20 may be controlled by reflecting the margin Pmarfccon1 (margin during charging, and the margin during charging is also referred to as "charging margin") into the target output of the FC 20 (electric power generator device) in such a way that the BAT terminal electric power Pbat (input electric power to the battery 30 (electric energy storage device)) does not exceed the BAT terminal input limit value Pbatlimin (input electric power threshold) (FIG. 3, FIG. 5, and FIG. 10). Accordingly, the battery 30 may be protected by avoiding the over-charging of the battery 30 by reducing the BAT terminal electric power Pbat.

Alternatively, according to the present embodiment, the output of the FC20 may be controlled by reflecting the margin Pmarfccon1 (margin during discharging, and the margin during discharging is also referred to as "discharging margin") into the target output of the FC 20 in such a way that the BAT terminal electric power Pbat (output electric power from the battery 30 (electric energy storage device)) does not exceed the BAT terminal output limit value Pbatlimout (output electric power threshold) (FIG. 3, FIG. 7, and FIG. 10). Accordingly, the battery 30 may be protected by avoiding the over-discharging of the battery 30 by reducing the BAT terminal electric power Pbat.

For example, even in a case where an instantaneous change occurs in the BAT terminal current Ibat that is one of the parameters relating to the input or output of the battery 30, the battery 30 may be protected by avoiding a rapid change in the input to or output from the battery 30 by limiting the electric power generation of the FC 20.

It is considered that causes of such an instantaneous change in the BAT terminal current Ibat may include, for example, a rapid change in the input electric power to the battery 30 (electric energy storage device) associated with a sudden change in the electric power consumption of the drive motor 12 due to locking, slipping, and the like in the vehicle wheels. Further, ripple noise or an output variation of the air pump 28 may also cause the instantaneous change in the BAT terminal current Ibat.

In the present embodiment, the FC converter ECU 26 (first converter controller device) calculates the margin Pmarfccon1 based on the communication delay time Tdey of the BAT terminal electric power limit values Pbatlimin, Pbatlimout, and the like (parameters) that are used for calculating the target output of the FC 20 (electric power generator device) and are outputted from the BAT ECU 32 (parameter outputting device) to the FC converter ECU 26 (FIG. 3 to FIG. 7).

According to the above, the margin Pmarfccon1 is allowed to be responsive to variations of the limit values Pbatlimin, Pbatlimout, and the like by reflecting the communication delay time Tdey (parameter variation) of the limit values Pbatlimin and Pbatlimout into the margin Pmarfccon1. Accordingly, the battery 30 may be protected by avoiding the over-discharging or the over-charging of the battery 30.

In the present embodiment, the BAT ECU 32 or the like (parameter outputting devices) includes the current sensor 84 that detects the primary-side current Ifccon1 (passing current) of the FC converter 24 (first converter) (FIG. 1). Further, the sensor values Mdir (parameters) include the primary-side current Ifccon1. The FC converter ECU 26 calculates the FC converter primary-side current margin Pmarfccon1 (margin during charging or margin during discharging) based on the primary-side current Ifccon1 (FIG. 8 and FIG. 9).

The primary-side current Ifccon1 of the FC converter 24 may influence the calculation of the target output of the FC 20 (electric power generator device). Further, in a case where the primary-side current Ifccon1 is relatively large, a variation thereof tends to become large. Accordingly, the battery 30 may be protected by avoiding the over-discharging or the over-charging of the battery 30 by using the primary-side current margin Pmarfccon1 based on the primary-side current Ifccon1.

In the present embodiment, the vehicle 10 (electric power system) includes the BAT converter (second converter) on the battery 30 (electric energy storage device) side and the BAT converter ECU 36 (second converter controller device) that controls the BAT converter 34 (FIG. 1). Further, the air pump 28 and the like that serve as the auxiliary machinery (second load) are connected to the electric power line 142 (wiring) connecting the battery 30 and BAT converter 34 (FIG. 1). Further, the control values Ccan (parameters) include the electric power consumption Paux of the auxiliary machinery (second load). Still Further, the FC converter ECU 26 (first converter controller device) calculates the auxiliary machinery electric power margins Pmaraux1 (margin during charging) and Pmaraux2 (margin during discharging) based on the communication delay time Tdey of the electric power consumption Paux of the auxiliary machinery (FIG. 4 to FIG. 7).

According to the above, the auxiliary machinery electric power margins Pmaraux1 and Pmaraux2 are allowed to be responsive to a variation of the electric power consumption Paux of the auxiliary machinery by reflecting the communication delay time Tdey (parameter variation) of the electric power consumption Paux of the auxiliary machinery into the auxiliary machinery electric power margins Pmaraux1 and Pmaraux2. Accordingly, the battery 30 may be protected by avoiding the over-discharging or the over-charging of the battery 30.

In the present embodiment, the vehicle 10 (electric power system) includes the MG ECU 50 (electric power management controller device) that manages shares of the FC 20 (electric power generator device) and the battery 30 (electric energy storage device) (FIG. 1). The MG ECU 50 sets the shares of the FC 20 and the battery 30 by reflecting the limit values Pbatlimin and Pbatlimout of the battery 30. Further, the FC converter ECU 26 (first converter controller device) sets the compensated limit value Pbatlimin2 that reflects the margins Pmaraux1, Pmardey1, and Pmarfccon1 into the limit value Pbatlimin (FIG. 4 and FIG. 5). Further, in a case where the battery 30 is in charging and the BAT terminal electric power Pbat (input electric power to the battery 30) does not exceeds the compensated limit value Pbatlimin2 (compensated input electric power threshold) (step S13 of FIG. 3: NO), the ECU 26 controls the FC converter 24 based on the share of the FC 20 (step S15). Further, in a case where the battery 30 is in charging and the BAT terminal electric power Pbat exceeds the compensated limit value Pbatlimin2 (step S13 of FIG. 3: YES), the ECU 26 limits the output of the FC 20 irrespective of the share of the battery 30 (step S14).

According to the above, the battery 30 may be protected by causing the FC converter ECU 26 to limit the output of the FC 20 even in a case where a command from the MG ECU 50 is delayed. Thus, even in a case where the control by the MG ECU 50 has not performed in time, the battery 30 may still be protected.

Particularly, in the present embodiment, the FC converter ECU 26 obtains the BAT terminal current Ibat directly from the current sensor 104 (FIG. 1). Thus, the BAT terminal electric power Pbat is updated at the cycle (update cycle Tdir) that is shorter than the update cycle Tcan via the CAN 70. Accordingly, the battery 30 may be protected with higher accuracy by quickly responding to a change in the BAT terminal electric power Pbat.

In the present embodiment, the vehicle 10 is used as an electric power system. This allows to protect the battery 30 in the vehicle 10.

B. Modification Example

It is to be understood that the present disclosure is not limited to the foregoing embodiment, and that various configurations may be employed based on the contents described in the present specification. For example, the following configurations may be employed.

[B1. Target Object]

In the foregoing embodiment, the present disclosure is applied to the vehicle 10, taking the vehicle 10 as the electric power system. However, the configuration is not limited thereto, for example, from a viewpoint of using at least one of the margins Pmaraux1, Pmardey1, Pmaraux2, Pmardey2, and Pmarfccon1. For example, the present disclosure may be applied to different objects that serve as electric power systems. For example, the present disclosure may be applied to moving objects such as ships, airplanes, and the like that serve as electric power systems. Further, the present disclosure may also be applied to robots, manufacturing apparatuses, home electric power systems, home electric appliances, and the like that serve as electric power systems.

[B2. Configuration of Vehicle 10]

(B2-1. FC20 (Electric Power Generator Device))

In the foregoing embodiment, the FC 20 (and the motor 12 at time of regeneration) is used as an electric power generator device capable of supplying an electric power to the battery 30 (FIG. 1 and the like). However, the configuration is not limited thereto, for example, from a viewpoint of the electric power generator device capable of supplying an electric power to the battery 30. For example, instead of the FC 20 or in addition to the FC 20, an electric energy storage device (another battery, a capacitor, and the like) different from the battery 30 or a generator driven by an engine may be used.

(B2-2. Drive Motor 12)

In the foregoing embodiment, the motor 12 is of an alternating-current type. However, the configuration is not limited thereto, for example, from a viewpoint of driving the vehicle 10. For example, the motor 12 may be of a direct-current type. In this case, instead of the inverter 14, an on/off switch may be provided.

In the foregoing embodiment, the motor 12 is for driving or propulsion of the FC vehicle 10. However, the configuration is not limited thereto, for example, from the viewpoint of using at least one of the margins Pmaraux1, Pmardey1, Pmaraux2, Pmardey2, and Pmarfccon1. For example, the motor 12 may be used for in-vehicle equipment (for example, an electrically operated power steering, an air compressor, and the air conditioner 40).

(B2-3. FC Converter 24 and BAT Converter 34)

Figure 13:
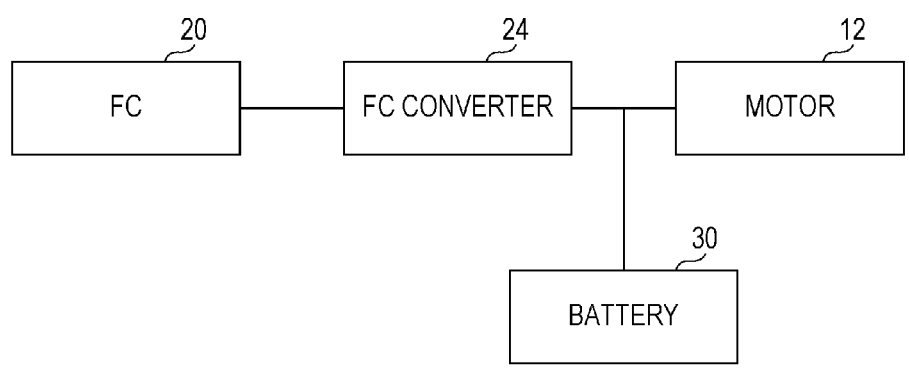
FIG. 13 is a block diagram depicting a schematic configuration of a modification example of a fuel cell vehicle according to the foregoing embodiment.

The foregoing embodiment is configured in such a way that the FC 20 and the battery 30 are arranged in parallel to each other, the FC converter 24 serving as the booster converter is arranged before the FC 20, and the BAT converter 34 serving as the booster/step-down converter is arranged before the battery 30 (FIG. 1 and the like). However, the configuration is not limited thereto, for example, from the viewpoint of using at least one of the margins Pmaraux1, Pmardey1, Pmaraux2, Pmardey2, and Pmarfccon1. For example, the FC converter 24 arranged before the FC 20 may not be of a booster type, but of a booster/step-down type or a step-down type. Alternatively, as depicted in FIG. 13, the configuration may be such that the FC 20 and the battery 30 are arranged in parallel to each other, and that the FC converter 24 serving as the DC/DC converter of a booster type, a step-down type, or a booster/step-down type is arranged before the FC 20.

(B2-4. Current Sensor 104 (Parameter Outputting Unit))

In the foregoing embodiment (FIG. 1), the current sensor 104 is connected to the FC converter ECU 26 via the signal line 106, and the BAT terminal current Ibat is directly inputted to the FC converter ECU 26. However, the configuration is not limited thereto, for example, from a viewpoint of directly inputting the parameters relating to the input or output of the battery 30 (electric energy storage device) to the FC converter ECU 26. For example, in addition to or instead of the BAT terminal current Ibat, the BAT terminal voltage Vbat may be directly inputted to the FC converter ECU 26. Alternatively, for example, from a viewpoint of setting the margin Pmarfccon1, the BAT terminal current Ibat may be inputted to the FC converter ECU 26 via the CAN 70 instead of directly inputting to the FC converter ECU 26.

(B2-5. CAN 70 and Signal Line 106 (First Signal System and Second Signal System))

In the foregoing embodiment, the sensor values Mdir, Mcan and the control values Ccan (parameters) are inputted to the FC converter ECU 26 using the CAN 70 and the signal line 106 (FIG. 1). However, the configuration is not limited thereto, for example, from a viewpoint of using a second signal system with which the sensor values Mcan and the control values Ccan reach a destination (for example, the FC converter ECU 26) in a shorter period of time compared to the case with a first signal system for transmitting the sensor values Mcan and the control values Ccan. For example, the first signal system for transmitting the sensor values Mcan and the control values Ccan may be configured as a low-speed CAN, and the second signal system for transmitting the sensor values Mdir may be configured as a high-speed CAN. Alternatively, as the first signal system and the second signal system, a local interconnect network (LIN), FlexRay, and the like may be used.

(B2-6. FC Converter ECU 26)

The FC converter ECU 26 of the foregoing embodiment uses the limit value Pbatlimin and the compensated limit value Pbatlimin2 to avoid the over-charging of the battery 30, and uses the limit value Pbatlimout and the compensated limit value Pbatlimout2 to avoid the over-discharging of the battery 30 (see FIG. 10). However, only one of these combinations, the limit value Pbatlimin and the compensated limit value Pbatlimin2 or the limit value Pbatlimout and the compensated limit value Pbatlimout2 may alternatively be used.

(B2-7. BAT ECU 32)

The BAT ECU 32 of the foregoing embodiment sets the limit values Pbatlimin and Pbatlimout based on the temperature Tbat and the SOC of the battery 30. However, for example, from a viewpoint of setting the limit values Pbatlimin and Pbatlimout, the limit values Pbatlimin and Pbatlimout may be set using only one of the temperature Tbat and the SOC of the battery 30.

(B2-8. FC Converter Passing Electric Power Switch Control)

At step S13 of FIG. 3, it is determined whether the passing electric power is to be switched by using the BAT terminal electric power Pbat as a criterion. However, the configuration is not limited thereto, for example, from the viewpoint of protecting the battery 30. For example, at step S13, the BAT terminal current Ibat or the BAT terminal voltage Vbat may be used as the criterion, instead of the BAT terminal electric power Pbat.

Further, in FIG. 3, the passing electric power of the FC converter 24 is switched based on the comparison between the BAT terminal electric power Pbat and the compensated limit values Pbatlimin2 and Pbatlimout2 (step S13 of FIG. 3). However, the configuration is not limited thereto, for example, from the viewpoint of protecting the battery 30. For example, values corresponding to the margins Pmaraux1, Pmardey1, Pmaraux2, Pmardey2, and Pmarfccon1 may be reflected into the target output or the target current (target primary-side current Ifccon1tar) of the FC 20.

For example, during charging of the battery 30, the target output or the target current (target primary-side current Ifccon1tar) of the FC 20 may be set low in advance based on at least one of an output decrease in the auxiliary machinery, the communication delay time Tdey, and the passing electric power of the FC converter 24. In this case, for example, in connection with the margin Pmarfccon1, a PID control in response to the primary-side current Ifccon1 may also be used. In other words, a PID term based on the primary-side current Ifccon1 may be added to the equation for calculating the target output or the target current.

Similarly, during discharging of the battery 30, the target output or the target current of the FC 20 may be set high in advance based on at least one of an output increase in the auxiliary machinery, the communication delay time Tdey, and the passing electric power of the FC converter 24.

In the foregoing embodiment, the compensated BAT terminal input limit value Pbatlimin2 is calculated in the order depicted in FIG. 4. However, the configuration is not limited thereto, for example, from a viewpoint of calculating the compensated BAT terminal input limit value Pbatlimin2. For example, the compensated BAT terminal input limit value Pbatlimin2 may also be calculated in the order depicted in FIG. 11.

Figure 11:
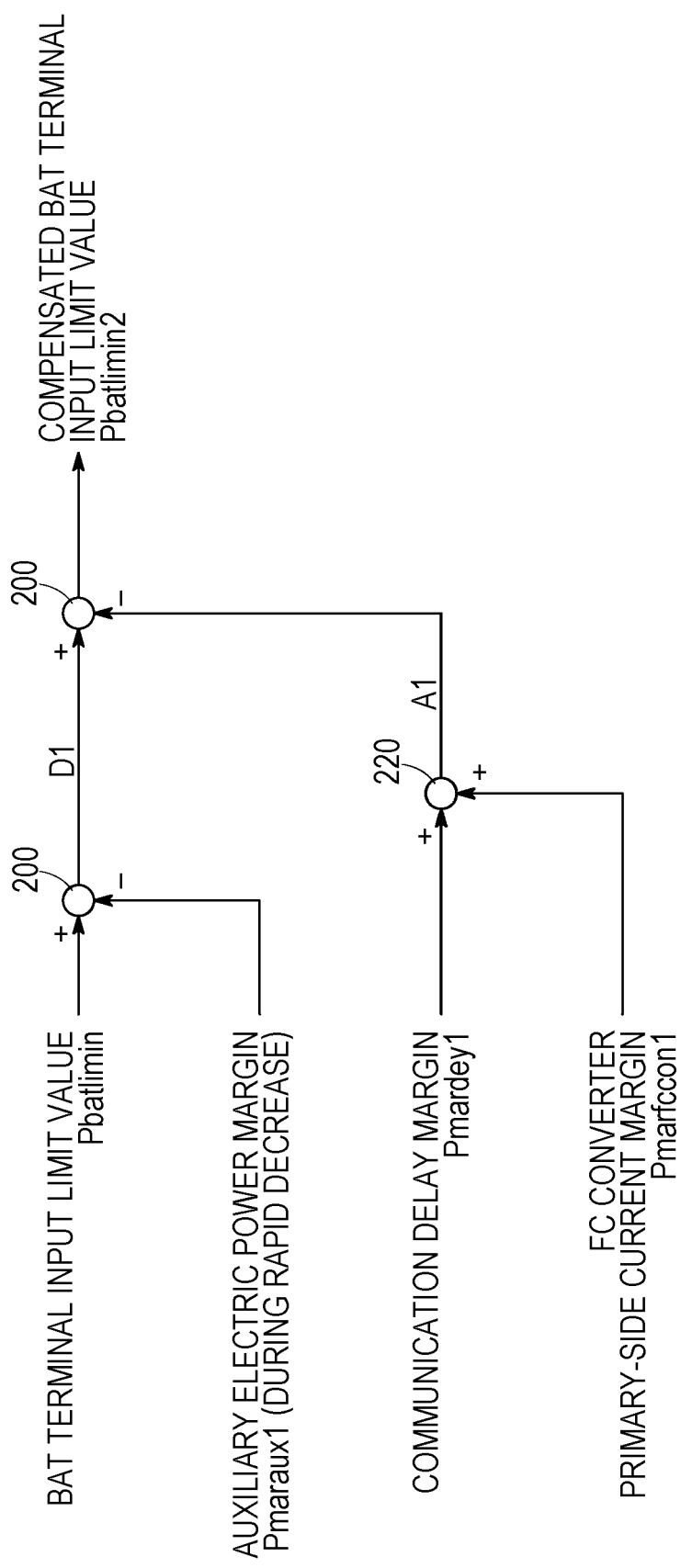
FIG. 11 is a diagram depicting setting of the compensated BAT terminal input limit value in a first modification example.

FIG. 11 is a diagram depicting setting of the compensated BAT terminal input limit value Pbatlimin2 in a first modification example. Here, the same reference numerals denote the same elements as in the foregoing embodiment, and detailed descriptions thereof are omitted to avoid redundancy.

At the subtractor 200 of FIG. 11, the ECU 26 subtracts the auxiliary machinery electric power margin Pmaraux1 from the BAT terminal input limit value Pbatlimin and outputs the different D1.

At an adder 220 of FIG. 11, the ECU 26 adds the communication delay margin Pmardey1 and the FC converter primary-side current margin Pmarfccon1, and outputs a sum A1.

At a subtractor 222, the ECU 26 subtracts the sum A1 (=Pmardey1+Pmarfccon1) from the difference D1 (=Pbatlimin−Pmaraux1) and outputs the compensated limit value Pbatlimin2.

(B2-9. Margins Pmaraux1, Pmardey1, Pmaraux1, Pmardey1, Pmarfccon1)

In the foregoing embodiment, during charging of the battery 30, three kinds of margins Pmaraux1, Pmardey1, and Pmarfccon1 are used (FIG. 4 and FIG. 5). However, the configuration is not limited thereto, for example, from a viewpoint of calculating the compensated limit value Pbatlimin2 by reflecting one of the margins Pmaraux1, Pmardey1, and Pmarfccon1 into the limit value Pbatlimin. For example, only one or two of the margins Pmaraux1, Pmardey1, and Pmarfccon1 may be used. The same applies to the time of discharging (during electric power generation) the battery 30.

In the foregoing embodiment, the FC converter primary-side current margin Pmarfccon1 is set based on the primary-side current Ifccon1 of the FC converter 24 (FIG. 8). However, the configuration is not limited thereto, for example, from a viewpoint of setting the margin based on the passing current of the FC converter 24 and a viewpoint of the electric power consumption of the auxiliary machinery that influences the passing current. For example, there is a certain relationship between the primary-side current Ifccon1 and the secondary-side current Ifccon2. Thus, instead of the primary-side current Ifccon1, the secondary-side current Ifccon2 may be used to set the margin Pmarfccon1. Alternatively, the margin Pmarfccon1 may be set based on, in addition to the primary-side current Ifccon1, a primary-side current change speed ΔIfccon1 (hereinafter, also referred to as "change speed ΔIfccon1") [A/sec] that is the time derivative value of the primary-side current Ifccon1.

Figure 12:
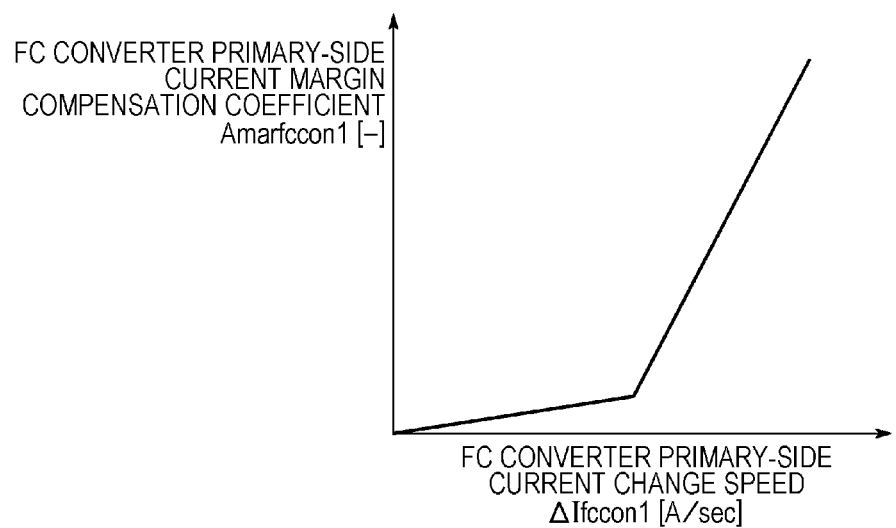
FIG. 12 is a diagram depicting an example of relationship between a FC converter primary-side current change speed and a FC converter primary-side current margin compensation coefficient in a second modification example.

FIG. 12 is a diagram depicting an example of relationship between the FC converter primary-side current change speed ΔIfccon1 and the FC converter primary-side current margin compensation coefficient Amarfccon1 (hereinafter, also referred to as "compensation coefficient Amarfccon1") in a second modification example. The compensation coefficient Amarfccon1 is a coefficient for reflecting an influence of the change speed ΔIfccon1 into the margin Pmarccon1.

As depicted in FIG. 12, the compensation coefficient Amarfccon1 is increased as the change speed ΔIfccon1 increases. The compensation coefficient Amarfccon1 may be used in the following way, for example. Specifically, in between step S21 and step S22 of FIG. 8, the primary-side current Ifccon1 is multiplied by the compensation coefficient Amarfccon to obtain a product M1. Next, at step S22, the product M1 and the threshold THi are compared. Next, at step S23, the margin Pmarfccon1 is set in response to the product M1. In this case, it is assumed that the transverse axis of FIG. 9 represents the product M1.

Accordingly, the margin Pmarfccon1 (margin during charging or margin during discharging) is calculated based on, in addition to the passing current of the FC converter 24 (first converter), the change speed ΔIfccon1. Thus, the margin Pmarfccon1 may be calculated with higher accuracy by reflecting the influence of the change speed ΔIfccon1 into the margin Pmarfccon1.

An electric power system according to one embodiment of the present disclosure includes: an electric power generator device that supplies an electric power to a load; a first converter on the electric power generator device side; a first converter controller device that controls the first converter; and an electric energy storage device that supplies an electric power to the load and stores an electric power of the electric power generator device, wherein the first converter controller device controls output of the electric power generator device by reflecting a margin during charging into a target output of the electric power generator device in such a way that an input electric power to the electric energy storage device does not exceed an input electric power threshold, or controls the output of the electric power generator device by reflecting a margin during discharging into the target output of the electric power generator device in such a way that an output electric power from the electric energy storage device does not exceed an output electric power threshold.

According to the foregoing embodiment of the present disclosure, the output of the electric power generator device is controlled by reflecting the margin during charging into the target output of the electric power generator device in such a way that the input electric power to the electric energy storage device does not exceed the input electric power threshold. Accordingly, the electric energy storage device may be protected by avoiding over-charging of the electric energy storage device by reducing the input electric power to the electric energy storage device.

Alternatively, according to the foregoing embodiment of the present disclosure, the output of the electric power generator device is controlled by reflecting the margin during discharging into the target output of the electric power generator device in such a way that the output electric power from the electric energy storage device does not exceed the output electric power threshold. Accordingly, the electric energy storage device may be protected by avoiding over-discharging of the electric energy storage device by reducing the output electric power from the electric energy storage device.

The first converter controller device may calculate the margin during charging or the margin during discharging based on a communication delay time of a parameter, the parameter being used for calculating the target output of the electric power generator device, the communication delay time being obtained for the parameter outputted from a parameter outputting device to the first converter controller device.

According to the above, the margin during charging or the margin during discharging is allowed to be responsive to a parameter variation by reflecting the communication delay time (parameter variation) of the parameter into the margin during charging or the margin during discharging. Accordingly, the electric energy storage device may be protected by avoiding the over-discharging or the over-charging of the electric energy storage device.

The parameter outputting device may include a current sensor for detecting a passing current of the first converter, the parameter may include the passing current of the first converter, and the first converter controller device may calculate the margin during charging or the margin during discharging based on the passing current of the first converter.

It is possible that the passing current of the first converter on the electric power generator device side influences the calculation of the target output of the electric power generator device. Further, in a case where the passing current is relatively large, a variation thereof tends to become large. Thus, by using the margin during charging or the margin during discharging based on the passing current of the first converter, the electric energy storage device may be protected by avoiding the over-discharging or the over-charging of the electric energy storage device.

The first converter controller device may calculate a time derivative value of the passing current of the first converter, and may calculate the margin during charging or the margin during discharging based on both the passing current and the time derivative value of the first converter.

Accordingly, the margin during charging or the margin during discharging may be calculated with higher accuracy by reflecting, in addition to the passing current of the first converter, the influence of the time derivative value of the passing current into the margin during charging or the margin during discharging.

The foregoing electric power system may further include a second converter on the electric energy storage device side, and a second converter controller device that controls the second converter, wherein a second load may be connected to wiring connecting the electric energy storage device and the second converter, the parameter may include an electric power consumption of the second load, and the first converter controller device may calculate the margin during charging or the margin during discharging based on a communication delay time of the electric power consumption of the second load.

According to the above, the margin during charging or the margin during discharging is allowed to be responsive to a variation of the electric power consumption of the second load by reflecting the communication delay time (parameter variation) of the electric power consumption of the second load into the margin during charging or the margin during discharging. Accordingly, the electric energy storage device may be protected by avoiding the over-discharging or the over-charging of the electric energy storage device.

The foregoing electric power system may further include an electric power management controller device that manages shares of the electric power generator device and the electric energy storage device, wherein the electric power management controller device may set the shares of the electric power generator device and the electric energy storage device by reflecting the input electric power threshold or the output electric power threshold of the electric energy storage device, the first converter controller device: may set a compensated input electric power threshold that reflects the margin during charging into the input electric power threshold; may control the first converter based on the share of the electric power generator device in a case where the electric energy storage device is in charging and the input electric power to the electric energy storage device does not exceed the compensated input electric power threshold, and may limit the output of the electric power generator device irrespective of the share of the electric power generator device in a case where the electric energy storage device is in charging and the input electric power to the electric energy storage device exceeds the compensated input electric power threshold.

According to the above, the electric energy storage device may be protected by causing the first converter controller device on the electric power generator device side to limit the output of the electric power generator device even in a case where a command from the electric power management controller device is delayed. Thus, even in a case where the control by the electric power management controller device has not performed in time, the electric energy storage device may still be protected.

The foregoing electric power system may be applied to a vehicle. This enables to protect the electric energy storage device in the vehicle.

According to the present disclosure, in a configuration including an electric power generator device and an electric energy storage device, the electric energy storage device may be protected more appropriately.

Obviously, numerous modifications and variations of the present invention are possible in light of the above teachings. It is therefore to be understood that within the scope of the appended claims, the invention may be practiced otherwise than as specifically described herein.

What is claimed is:

1. An electric power system comprising:
an electric power generator device that supplies an electric power to a load;
a first converter on electric power generator device side;
a first converter controller device that controls the first converter; and
an electric energy storage device that supplies an electric power to the load and stores an electric power of the electric power generator device, wherein
the first converter controller device
controls output of the electric power generator device by reflecting a margin during charging into a target output of the electric power generator device such that an input electric power to the electric energy storage device does not exceed an input electric power threshold, or
controls the output of the electric power generator device by reflecting a margin during discharging into the target output of the electric power generator device such that an output electric power from the electric energy storage device does not exceed an output electric power threshold, wherein
the first converter controller device calculates the margin during charging or the margin during discharging based on a communication delay time of a parameter and based on a variation of the parameter over time, the parameter being used for calculating the target output of the electric power generator device, the communication delay time being obtained for the parameter outputted from a parameter outputting device to the first converter controller device, and wherein
the parameter outputting device includes a current sensor for detecting a passing current of the first converter, the parameter includes the passing current of the first converter, and the first converter controller device calculates the margin during charging or the margin during discharging based on the passing current of the first converter.

2. The electric power system according to claim 1, wherein the first converter controller device
calculates a time derivative value of the passing current of the first converter, and
calculates the margin during charging or the margin during discharging based on both the passing current and the time derivative value of the first converter.

3. The electric power system according to claim 1, further comprising:
a second converter on electric energy storage device side; and
a second converter controller device that controls the second converter, wherein
a second load is connected to wiring connecting the electric energy storage device and the second converter,
the parameter includes an electric power consumption of the second load, and
the first converter controller device calculates the margin during charging or the margin during discharging based on a communication delay time of the electric power consumption of the second load.

4. The electric power system according to claim 1, further comprising:
an electric power management controller device that manages allocations of the electric power generator device and the electric energy storage device, wherein
the electric power management controller device sets the allocations of the electric power generator device and the electric energy storage device by reflecting the input electric power threshold or the output electric power threshold of the electric energy storage device, and
the first converter controller device
sets a compensated input electric power threshold that reflects the margin during charging into the input electric power threshold,
controls the first converter based on the allocation of the electric power generator device in a case where the electric energy storage device is in charging and the input electric power to the electric energy storage device does not exceed the compensated input electric power threshold, and
limits the output of the electric power generator device irrespective of the allocation of the electric power generator device in a case where the electric energy storage device is in charging and the input electric power to the electric energy storage device exceeds the compensated input electric power threshold.

5. The electric power system according to claim 1, wherein the electric power system is a vehicle.

6. The electric power system according to claim 1, wherein the electric power system is configured to
use the input electric power threshold and the margin during charging to determine a timing at which the electric power supplied by the electric power generator device is changed before the input electric power threshold is exceeded, or
use the output electric power threshold and the margin during discharging to determine a timing at which the electric power supplied by the electric power generator device is changed before the output electric power threshold is exceeded.

7. The electric power system according to claim 1, wherein the electric power system is configured to change the input electric power threshold or the output electric power threshold over time.

8. The electric power system according to claim 1, wherein the input electric power threshold represents a rate at which electric energy is input to the electric energy storage device and the output electric power threshold represents a rate at which electric energy is output from the electric energy storage device.

9. The electric power system according to claim 1, wherein the first converter controller device is configured to
modify a timing at which the electric power supplied by the electric power generator device is changed before the input electric power threshold is exceeded, based on the variation of the parameter and a corresponding variation in the margin during charging, or
modify a timing at which the electric power supplied by the electric power generator device is changed before the output electric power threshold is exceeded, based on the variation of the parameter and a corresponding variation in the margin during discharging.

10. An electric power system comprising:
an electric power generator to supply an electric power to a load;
a first converter provided to control the electric power generator;
an electric energy storage device to store an electric power from the electric power generator to supply an electric power to the load; and
a first converter controller to correct a target output of the electric power generator based on a charging margin so as to control an output of the electric power generator via the first converter so that an input electric power to the electric energy storage device does not exceed an input electric power threshold of the electric energy storage device or to correct the target output of the electric power generator based on a discharging margin so as to control the output of the electric power generator via the first converter so that an output electric power from the electric energy storage device does not exceed an output electric power threshold of the electric energy storage device,
wherein the first converter controller calculates the charging margin or the discharging margin based on a communication delay time of a parameter and based on a variation of the parameter over time, the parameter being used to calculate the target output of the electric power generator, the communication delay time of the parameter being obtained for the parameter outputted from a parameter outputting device to the first converter controller,
wherein the parameter outputting device includes a current sensor to detect a passing current of the first converter,
wherein the parameter includes the passing current of the first converter, and
wherein the first converter controller calculates the charging margin or the discharging margin based on the passing current of the first converter.

11. The electric power system according to claim 10, wherein the first converter controller calculates a time derivative value of the passing current of the first converter, and
wherein the first converter controller calculates the charging margin or the discharging margin based on both the passing current and the time derivative value of the passing current of the first converter.

12. The electric power system according to claim 10, further comprising:
a second converter provided on an electric energy storage device side; and
a second converter controller to control the second converter,
wherein a second load is connected to wiring connecting the electric energy storage device and the second converter,
wherein the parameter includes an electric power consumption of the second load, and
wherein the first converter controller calculates the charging margin or the discharging margin based on a communication delay time of the electric power consumption of the second load.

13. The electric power system according to claim 10, further comprising:
an electric power management controller to manage allocations of the electric power generator and the electric energy storage device,
wherein the electric power management controller sets the allocations of the electric power generator and the electric energy storage device based on the input electric power threshold or the output electric power threshold of the electric energy storage device,
wherein the first converter controller corrects the input electric power threshold based on the charging margin to set a corrected input electric power threshold,
wherein the first converter controller controls the first converter based on the allocation of the electric power generator in a case where the electric energy storage device is in charging and the input electric power to the electric energy storage device does not exceed the corrected input electric power threshold, and
wherein the first converter controller limits the output of the electric power generator irrespective of the allocation of the electric power generator in a case where the electric energy storage device is in charging and the input electric power to the electric energy storage device exceeds the corrected input electric power threshold.

14. The electric power system according to claim 10, wherein the electric power system includes a vehicle.

15. The electric power system according to claim 10,
wherein the parameter outputting device includes a current sensor to detect a passing current of the first converter,
wherein the parameter includes the passing current of the first converter, and
wherein the first converter controller uses a current margin based on the passing current of the first converter to calculate the charging margin or the discharging margin in a case where the passing current of the first converter is larger than a predetermined threshold.

16. The electric power system according to claim 10, wherein the input electric power threshold represents a rate at which electric energy is input to the electric energy storage device and the output electric power threshold represents a rate at which electric energy is output from the electric energy storage device.

17. The electric power system according to claim 10, wherein the first converter controller is configured to
modify a timing at which the electric power supplied by the electric power generator is changed before the input electric power threshold is exceeded, based on the variation of the parameter and a corresponding variation in the margin during charging, or
modify a timing at which the electric power supplied by the electric power generator is changed before the output electric power threshold is exceeded, based on the variation of the parameter and a corresponding variation in the margin during discharging.

18. An electric power system comprising:
an electric power generator device that supplies an electric power to a load;
a first converter on electric power generator device side;
a first converter controller device that controls the first converter; and
an electric energy storage device that supplies an electric power to the load and stores an electric power of the electric power generator device, wherein
the first converter controller device is configured to
control output of the electric power generator device during charging based on an input electric power threshold, which is a maximum rate at which electric energy is input to the electric energy storage device, such that a charging rate does not exceed the input electric power threshold, or
control the output of the electric power generator device during discharging based on an output electric power threshold, which is a maximum rate at which electric energy is output from the electric energy storage device, such that a discharging rate does not exceed the output electric power threshold,
the first converter controller device calculates a margin during charging or a margin during discharging based on a communication delay time of a parameter and based on a variation of the parameter over time, the parameter being used for calculating a target output of the electric power generator device, the communication delay time being obtained for the parameter outputted from a parameter outputting device to the first converter controller device,
the parameter outputting device includes a current sensor for detecting a passing current of the first converter,
the parameter includes the passing current of the first converter, and
the first converter controller device calculates the margin during charging or the margin during discharging based on the passing current of the first converter.

19. The electric power system according to claim 18, wherein the electric power system is configured to
use the input electric power threshold and the margin during charging to determine a timing at which the electric power supplied by the electric power generator is changed before the input electric power threshold is exceeded, or
use the output electric power threshold and the margin during discharging to determine a timing at which the electric power supplied by the electric power generator is changed before the output electric power threshold is exceeded.

20. The electric power system according to claim 18, wherein the electric power system is configured to change the input electric power threshold or the output electric power threshold over time.

21. The electric power system according to claim 18, wherein the first converter controller device is configured to
modify a timing at which the electric power supplied by the electric power generator device is changed before the input electric power threshold is exceeded, based on the variation of the parameter and a corresponding variation in the margin during charging, or
modify a timing at which the electric power supplied by the electric power generator device is changed before the output electric power threshold is exceeded, based on the variation of the parameter and a corresponding variation in the margin during discharging.

\* \* \* \* \*